US011148224B2

(12) United States Patent
Yamaguchi

(10) Patent No.: US 11,148,224 B2
(45) Date of Patent: Oct. 19, 2021

(54) PROCESSING APPARATUS AND PROGRAM

(71) Applicant: Futaba Industrial Co., Ltd., Aichi (JP)

(72) Inventor: Koji Yamaguchi, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 542 days.

(21) Appl. No.: 15/770,093

(22) PCT Filed: Aug. 8, 2016

(86) PCT No.: PCT/JP2016/073318
§ 371 (c)(1),
(2) Date: Apr. 20, 2018

(87) PCT Pub. No.: WO2017/068836
PCT Pub. Date: Apr. 27, 2017

(65) Prior Publication Data
US 2018/0311763 A1 Nov. 1, 2018

(30) Foreign Application Priority Data
Oct. 21, 2015 (JP) .............................. JP2015-207356

(51) Int. Cl.
*B23K 26/046* (2014.01)
*B23K 26/082* (2014.01)
(Continued)

(52) U.S. Cl.
CPC ............ *B23K 26/046* (2013.01); *B23K 26/03* (2013.01); *B23K 26/082* (2015.10); *B23K 26/21* (2015.10); *B23K 26/707* (2015.10)

(58) Field of Classification Search
CPC .... B23K 26/046; B23K 26/082; B23K 26/21; B23K 26/707; B23K 26/03;
(Continued)

(56) References Cited

U.S. PATENT DOCUMENTS 6,519,043 B1 * 2/2003 Wang .................. G01B 11/306
356/614
2008/0223831 A1 * 9/2008 Yoshikawa .......... B23K 26/082
219/121.63
2009/0154504 A1 * 6/2009 Sato ..................... B23K 26/082
372/10

FOREIGN PATENT DOCUMENTS

JP 2004130361 A 4/2004

OTHER PUBLICATIONS

Canadian Office Action, dated Jan. 29, 2019, for Canadian Application No. 3,001,967.
(Continued)

*Primary Examiner* — Tu B Hoang
*Assistant Examiner* — Diallo I Duniver
(74) *Attorney, Agent, or Firm* — David D. Brush; Westman, Champlin & Koehler, P.A.

(57) ABSTRACT

A processing apparatus, which is provided with a processing space to place a workpiece therein and configured to process the workpiece placed in the processing space using a laser, includes a laser emitter, a processing position specifying device, a target emission condition computing device, an emission controller, a correction amount specifying device, a post-correction focal position computing device, and a post-correction emission condition computing device. The emission controller controls the laser emitter to emit the laser under a post-correction emission condition when a Z-axis correction amount is updated in the correction amount specifying device.

7 Claims, 9 Drawing Sheets

(51) Int. Cl.
  *B23K 26/21* (2014.01)
  *B23K 26/70* (2014.01)
  *B23K 26/03* (2006.01)
(58) Field of Classification Search
  CPC ............ B23K 26/0643; B23K 26/0648; B23K 26/0892; B23K 26/073; B23K 26/26; B23K 26/0884; B23K 26/032; B23K 26/00; B41J 2/471; G02B 26/12; H01L 29/66757; H01L 29/78675; H01L 29/78678; H01L 29/02686; H01L 27/1285; H01L 29/76; H01L 21/36
  USPC ............... 219/121.6–121.64, 121.73–121.75, 219/121.78–121.79, 121.81, 121.83, 219/121.85; 700/166
  See application file for complete search history.

(56) References Cited

OTHER PUBLICATIONS

International Preliminary Report on Patentability and English Translation of the Written Opinion dated dated Apr. 24, 2018 for corresponding International Application No. PCT/JP2016/073318, filed Aug. 8, 2016.
International Search Report dated Sep. 7, 2016 for corresponding International Application No. PCT/JP2016/073318, filed Aug. 8, 2016.
Written Opinion of the International Searching Authority dated Sep. 7, 2016 for corresponding International Application No. PCT/JP2016/073318, filed Aug. 8, 2016.

* cited by examiner

PROCESSING APPARATUS AND PROGRAM

CROSS-REFERENCE TO RELATED APPLICATION

This Application is a Section 371 National Stage of International Application No. PCT/JP2016/073318, filed Aug. 8, 2016, published as WO2017/068836 A1 on Apr. 27, 2017, which is based on and claims the benefit of Japanese Patent Application No. 2015-207356 filed on Oct. 21, 2015 with the Japan Patent Office, and the entire disclosures of which are incorporated herein by reference.

TECHNICAL FIELD

The present disclosure relates to a processing apparatus that comprises a processing space to place therein a workpiece and processes the workpiece placed in the processing space using a laser.

BACKGROUND ART

There is a well-known processing apparatus that is provided with a processing space to place therein a workpiece and processes the workpiece placed in the processing space using a laser (Patent Document 1). Specific examples of such processing include welding and cutting.

The processing apparatus processes the workpiece by setting a laser focal position to a target processing position of the workpiece and then emitting a laser. In this case, the laser focal position is set, for example, based on a coordinate position in the processing space.

However, in the event that the workpiece is deformed due to thermal expansion caused by a temperature change or the like, an error may occur between the laser focal position and the target processing position, resulting in deviation of an actual processing position (the laser focal position) from the target processing position.

In such case, an operator may measure an error dimension between the target processing position and the laser focal position and perform a position adjustment operation to change the laser focal position based on the error dimension, thereby allowing setting (correction) of the laser focal position to the target processing position.

The processing apparatus may be configured to include a computer that can execute various programs. In this case, by using a program to execute a position adjustment operation, it is possible to make the computer function as an element to perform the position adjustment operation in the processing apparatus.

PRIOR ART DOCUMENTS

Patent Documents

Patent Document 1: Japanese Unexamined Patent Application Publication No. 2004-130361

SUMMARY OF THE INVENTION

Problems to be Solved by the Invention

In a case, however, where a changing direction of the laser focal position by the position adjustment operation is not parallel with an emission direction of the laser, a single position adjustment operation may not be sufficient to set (correct) the laser focal position to the target processing position, and thus a plurality of position adjustment operations may be required.

A description will now be given of a position adjustment operation performed in a conventional processing apparatus with reference to FIG. 8 and FIG. 9. In FIG. 8, an optional coordinate position in the processing space is expressed in a three-dimensional orthogonal coordinate system (a coordinate system defined by an X-axis direction, a Y-axis direction, and a Z-axis direction), and the states of various parts are shown with the right-left direction of the figure as the X-axis direction and the up-down direction of the figure as the Z-axis direction.

A first state in FIG. 8 is a state in which, although an emission direction of a laser 100 is properly set toward a target processing position 102 of a workpiece 101, a laser focal position 103 is deviated from the target processing position 102 due to an improper laser focal length, thus disabling proper processing at the target processing position 102 of the workpiece 101. In this case, the emission direction of the laser 100 intersects the target processing position 102 of the workpiece 101, and thus, a processing trace by the laser 100 may be formed at the target processing position 102. However, not in the laser focal position 103, a processing energy is insufficient, resulting in a defective processed condition. Such workpiece 101 having an insufficient processing quality will be disposed as a defective product.

In a case where the laser used for processing is an invisible light, the operator measures the laser focal position using a measuring device for measuring a laser focal position, and then measures an error dimension between the laser focal position and the target processing position. When using such measuring device, however, although it is easy to measure, for example, a distance between the laser focal position 103 and the workpiece 101 (an error in the Z-axis direction) in the first state of FIG. 8, it is difficult in most cases to measure a relative positional relationship (respective errors in the X-axis, Y-axis, and Z-axis directions) between the laser focal position 103 and the target processing position 102. Specifically, in a case of measuring only an error in the Z-axis direction, it is sufficient to measure an error in one of three directions in three dimensions, whereas in a case of measuring respective errors in the X-axis, Y-axis, and Z-axis directions, it is necessary to specify an emission direction (angle) of the laser; however, the emission direction of the laser varies depending on its focal position and thus is difficult to be specified. Also, measuring all the errors in the three directions in the three dimensions requires a large measurement workload and is likely to cause measurement errors.

It may be possible to first correct the laser focal position depending on the error in the Z-axis direction, to thereby place the laser focal position 103 on the workpiece 101 as in a second state. In this case, however, a new error in the X-axis direction is caused between a corrected processing position 104 and the target processing position 102. Accordingly, the error dimension in the X-axis direction from the corrected processing position 104 to the target processing position 102 on the workpiece 101 is measured using a ruler or the like, and the laser focal position is corrected depending on the error dimension in the X-axis direction, and thereby the laser focal position 103 may be set (corrected) to the target processing position 102 as in a third state. Although it is not shown in FIG. 8, in a case where an error in the Y-axis direction is caused, a further correction of the laser focal position is made depending on the error in the Y-axis direction.

For example, as shown in a first state in FIG. 9, if the laser emission direction is properly set toward target processing positions 112, 113, but the laser focal length is improper when welding a first member 110 and a second member 111, welding traces are formed in target processing positions 112, 113 but sufficient strength is not obtained, resulting in poor welding quality. To achieve a proper quality of welding (processing) in the target processing positions 112, 113, it is necessary to perform an adjustment operation of the laser focal position in a stacking direction of the first member 110 and the second member 111 such that the laser focal position coincides with the target processing positions 112, 113.

However, as a result of the adjustment operation, welding may be performed in incorrect processing positions 114, 115 that are different from the target processing positions 112, 113 as shown in a second state. Specifically, as a result of the adjustment operation of the laser focal position in the stacking direction of the first member 110 and the second member 111 (assuming it as the Z-axis direction), an error (a positional deviation) in sheet plane directions of the second member 111 (directions perpendicular to the Z-axis direction (the X-axis direction and the Y-axis direction)) may be newly caused. In this case, a required times of subsequent adjustment operations of the laser focal position may achieve a proper quality of welding in the target processing positions 112, 113.

As described using FIG. 8 and FIG. 9, in order to set (correct) the laser focal position to the target processing position, a single position adjustment operation (only in the Z-axis direction) may be insufficient, and a plurality of position adjustment operations, such as twice (in the Z-axis direction and the X-axis direction) or three times (in the Z-axis direction, the X-axis direction, and the Y-axis direction), may be required in such case.

If the changing direction of the laser focal position (a direction of the error dimension measurable by the measuring device) by the position adjustment operation and the emission direction of the laser (a direction of the error between the laser focal position and the target processing position) are parallel to each other in the first state of FIG. 8 or FIG. 9, the laser focal position may be set (corrected) to the target processing position by a single position adjustment operation. That is, in a case where an error occurs only in the Z-axis direction (there is no error in the X-axis direction or the Y-axis direction), the laser focal position can be set (corrected) to the target processing position by a single position adjustment operation in the Z-axis direction.

However, the emission direction of the laser (the direction of the error between the laser focal position and the target processing position) varies (is not fixed) depending on the target processing position in the processing space; thus, the error between the laser focal position and the target processing position is likely to occur in each of the X-axis direction, the Y-axis direction, and the Z-axis direction, and is less likely to occur only in the Z-axis direction.

Accordingly, when the error occurs between the laser focal position and the target processing position, a plurality of position adjustment operations are required, and a long time is required for the position adjustment operations, leading to a large workload.

In one aspect of the present disclosure, it is preferable to provide a processing apparatus and a program that can reduce a time required for a position adjustment operation when an error occurs between a laser focal position and a target processing position, thereby reducing a workload.

Means for Solving the Problems

A processing apparatus in one aspect of the present disclosure, which is provided with a processing space to place a workpiece therein and configured to process the workpiece placed in the processing space using a laser, comprises a laser emitter, a processing position specifying device, a target emission condition computing device, an emission controller, a correction amount specifying device, a post-correction focal position computing device, and a post-correction emission condition computing device.

The laser emitter is configured to change, when emitting the laser toward the processing space, an emission condition that comprises at least an emission direction and a focal length of the laser, to thereby change a focal position of the laser in the processing space.

The processing position specifying device is configured to specify a target processing position on the workpiece based on a coordinate position in a three-dimensional orthogonal coordinate system in the processing space.

The target emission condition computing device is configured to compute a target emission condition, which is one of the emission condition corresponding to a coordinate position of the target processing position in the processing space based on coordinate conversion information. The coordinate conversion information is information specifying a correspondence between an optional coordinate position in the processing space and the emission condition in a case of setting the focal position to the optional coordinate position.

The emission controller is configured to control the laser emitter so as to emit the laser under the target emission condition.

The processing apparatus is configured such that the processing position specifying device specify a target processing position, the target emission condition computing device computes a target emission condition corresponding to a coordinate position of the target processing position, and the emission controller controls the laser emitter so as to emit the laser under the target emission condition, and thereby the laser is emitted from the laser emitter.

In the three-dimensional orthogonal coordinate system in the processing space, a direction from the laser emitter toward the processing space is defined as a Z-axis direction, and directions perpendicular to the Z-axis direction are defined as an X-axis direction and a Y-axis direction.

The laser emitter comprises an emission direction changer and a focal length changer.

The emission direction changer comprises at least one changer to change an emission direction (a traveling direction) of the laser, and is configured to change the emission direction of the laser depending on a rotation state of the at least one changer to thereby change an X-axis component and a Y-axis component in the emission direction of the laser. The at least one changer may be configured, for example, by using a reflection-type changer (such as a reflection mirror) that changes the emission direction of the laser depending on a reflection angle when reflecting the laser, or a transmission-type changer (such as a lens) that changes the emission direction of the laser depending on a transmission angle when the laser transmits therethrough.

When the emission direction changer is provided with a single changer as the at least one changer, the single changer is configured to comprise the X-axis component and the Y-axis component as rotatable directions to change the emission direction of the laser. The emission direction changer also may be provided with two changers (for example, an X-axis changer and a Y-axis changer) as the at least one changer. In this case, the X-axis changer is configured to comprise the X-axis component as rotatable directions. That is, the X-axis changer is a changer configured to change the rotation state to thereby change the emission direction of the laser, so that the emission direction of the laser is changed parallel to the X-axis direction. The Y-axis changer is configured to comprise the Y-axis component as rotatable directions. That is, the Y-axis changer is a changer configured to change the rotation state to thereby change the emission direction of the laser, so that the emission direction of the laser is changed parallel to the Y-axis direction.

The focal length changer is configured to change at least one of a focusing state or a collecting state of the laser, to thereby change the focal length of the laser.

The correction amount specifying device specifies a Z-axis correction amount, which is a difference value in the Z-axis direction between a pre-correction focal position and a post-correction focal position.

The post-correction focal position computing device computes an X-axis correction amount, which is a difference value in the X-axis direction between the pre-correction focal position and the post-correction focal position, based on the Z-axis correction amount and X-axis component information in the rotation state of the at least one changer. The post-correction focal position computing device also computes a Y-axis correction amount, which is a difference value in the Y-axis direction between the pre-correction focal position and the post-correction focal position, based on the Z-axis correction amount and Y-axis component information in the rotation state of the at least one changer.

The "X-axis component information in the rotation state of the at least one changer" is information related to changes in the X-axis component in the emission direction of the laser, among information on the rotation state of the at least one changer. One example of the "X-axis component information in the rotation state of the at least one changer" may be, in a case of assuming, for example, a virtual vector indicating the rotation state of the at least one changer (for example, a direction of an outer surface of the at least one changer), an angle between a projection vector obtained by projecting the virtual vector on the X-Z plane and a specified reference vector. Similarly, the "Y-axis component information in the rotation state of the at least one changer" is information related to changes in the Y-axis component in the emission direction of the laser, among information on the rotation state of the at least one changer. One example of the "Y-axis component information in the rotation state of the at least one changer" may be, in a case of assuming, for example, a virtual vector indicating the rotation state of the at least one changer (for example, a direction of an outer surface of the at least one changer), an angle between a projection vector obtained by projecting the virtual vector on the Y-Z plane and a specified reference vector.

Also, the post-correction focal position computing device computes a coordinate position of the post-correction focal position using the X-axis correction amount, the Y-axis correction amount, the Z-axis correction amount, and a coordinate position of the pre-correction focal position.

The post-correction emission condition computing device computes a post-correction emission condition, which is the emission condition corresponding to the coordinate position of the post-correction focal position, based on the coordinate conversion information.

The emission controller controls the laser emitter to emit the laser under the post-correction emission condition when the Z-axis correction amount is updated in the correction amount specifying device.

The laser emitter of the processing apparatus comprises the emission direction changer and the focal length changer, and is configured to control the emission direction of the laser by changing the rotation state of the at least one changer in the emission direction changer and to control the focal length of the laser by changing the focal length condition of the focal length changer. That is, the laser emitter can change the laser focal position in the processing space by changing the rotation state of the at least one changer in the emission direction changer and changing the focal length condition of the focal length changer.

The processing apparatus is configured such that when the correction amount specifying device specifies the Z-axis correction amount, the post-correction focal position computing device computes the X-axis correction amount and the Y-axis correction amount using the Z-axis correction amount, and computes the coordinate position of the post-correction focal position. In other words, in the case of specifying the coordinate position of the post-correction focal position using the processing apparatus, an operator is required to specify only the Z-axis correction amount and is not required to specify the X-axis correction amount or the Y-axis correction amount.

Moreover, the post-correction emission condition computing device computes the post-correction emission condition based on the coordinate conversion information, and the emission controller controls the laser emitter to emit the laser under the post-correction emission condition; accordingly, the laser focal position can be set (corrected) to the target processing position depending on the Z-axis correction amount specified by the correction amount specifying device.

That is, the processing apparatus allows, even when an error occurs between the laser focal position and the target processing position, setting (correction) of the laser focal position to the target processing position by a position adjustment operation based only on the Z-axis correction amount.

Accordingly, the processing apparatus enables reduction in time required for the position adjustment operation and reduction in workload.

Examples of processing by the processing apparatus may include welding and cutting.

A program in another aspect of the present disclosure is a program that causes a computer to function as the processing position specifying device, the target emission condition computing device, the emission controller, the correction amount specifying device, the post-correction focal position computing device, and the post-correction emission condition computing device according to the above-described processing apparatus.

A processing apparatus that comprises the laser emitter and the computer as described above can achieve the same effects as the above-described processing apparatus by using the program to cause the computer to function as various components in the above-described processing apparatus.

The program may be recorded in a non-transitory tangible computer-readable recording medium, such as an FD, an MO, a DVD-ROM, a CD-ROM, and a hard disk, and may be used by loading and starting the program on a computer when necessary. The program also may be downloaded on a computer system via a communication network. Further, the program may be recorded in a ROM or a backup RAM as the non-transitory tangible computer-readable recording medium and may be used by installing the ROM or the backup RAM in a computer.

Yet another aspect of the present disclosure is a method for processing a workpiece using a processing apparatus that comprises a laser emitter configured to emit a laser.

The method comprises: specifying a target processing position on the workpiece based on a coordinate position in a three-dimensional orthogonal coordinate system in a processing space, in which the workpiece is placed, wherein the three-dimensional orthogonal coordinate system comprises a Z-axis from the laser emitter toward the processing space, an X-axis orthogonal to the Z-axis, and a Y-axis orthogonal to the Z-axis and the X-axis;

computing a target emission condition of the laser based on specified coordinate conversion information, wherein the coordinate conversion information specifies a correspondence between an optional coordinate position in the processing space and an emission condition in a case of setting a focal position to the optional coordinate position, the target emission condition is an emission condition of the laser corresponding to a coordinate position of the target processing position in the processing space, the emission condition of the laser comprise an emission direction of the laser and a focal length of the laser;

controlling the laser emitter so as to emit the laser under the target emission condition;

specifying a Z-axis correction amount, which indicates a difference along the Z-axis between a pre-correction focal position and a post-correction focal position, the pre-correction focal position being a focal position of the laser before correction, and the post-correction focal position being a focal position of the laser after correction;

computing an X-axis correction amount, which indicates a difference along the X-axis between the pre-correction focal position and the post-correction focal position based on the Z-axis correction amount and X-axis component information, the X-axis component information indicates a component in the emission direction of the laser along the X-axis;

computing a Y-axis correction amount, which indicates a difference along the Y-axis between the pre-correction focal position and the post-correction focal position based on the Z-axis correction amount and Y-axis component information, the Y-axis component information indicates a component in the emission direction of the laser along the Y-axis;

computing the post-correction focal position using the X-axis correction amount, the Y-axis correction amount, the Z-axis correction amount, and the pre-correction focal position;

computing a post-correction emission condition, the post-correction emission condition being the emission condition of the laser corresponding to the post-correction focal position based on the coordinate conversion information; and controlling the laser emitter to emit the laser under the post-correction emission condition when the Z-axis correction amount is updated.

In the processing method, the Z-axis correction amount is specified and the X-axis correction amount and the Y-axis correction amount are computed using the Z-axis correction amount, and also the coordinate position of the post-correction focal position is computed. In other words, in the case of specifying the coordinate position of the post-correction focal position using the processing method, an operator is required to specify only the Z-axis correction amount and is not required to specify the X-axis correction amount or the Y-axis correction amount.

Also, in the processing method, the laser focal position can be set (corrected) to the target processing position depending on the specified Z-axis correction amount by computing the post-correction emission condition based on the coordinate conversion information and controlling the laser emitter to emit the laser under the post-correction emission condition.

In other words, the processing method allows, when an error occurs between the laser focal position and the target processing position, setting (correction) of the laser focal position to the target processing position by a position adjustment operation based only on the Z-axis correction amount.

Accordingly, the processing method enables reduction in time required for the position adjustment operation and reduction in workload.

EXPLANATION OF REFERENCE NUMERALS

1 . . . processing apparatus, 11 . . . remote welding system, 13 . . . remote welding head, 13a . . . X-axis reflector, 13b . . . Y-axis reflector, 13c . . . focal length changer, 15 . . . laser transmitter, 15a . . . laser controller, 17 . . . welding work area, 19 . . . workpiece, 21 . . . digital I/O module, 23 . . . adjuster, 31 . . . controller, 33 . . . microcomputer, 90 . . . laser, 91 . . . workpiece, 92 . . . target welding position, 93 . . . laser focal position.

MODE FOR CARRYING OUT THE INVENTION

Hereinafter, one embodiment to which the present disclosure is applied will be described with reference to the drawings.

1. First Embodiment

[1-1. Overall Configuration]

A description will be given of a processing apparatus of the present embodiment.

Figure 1:
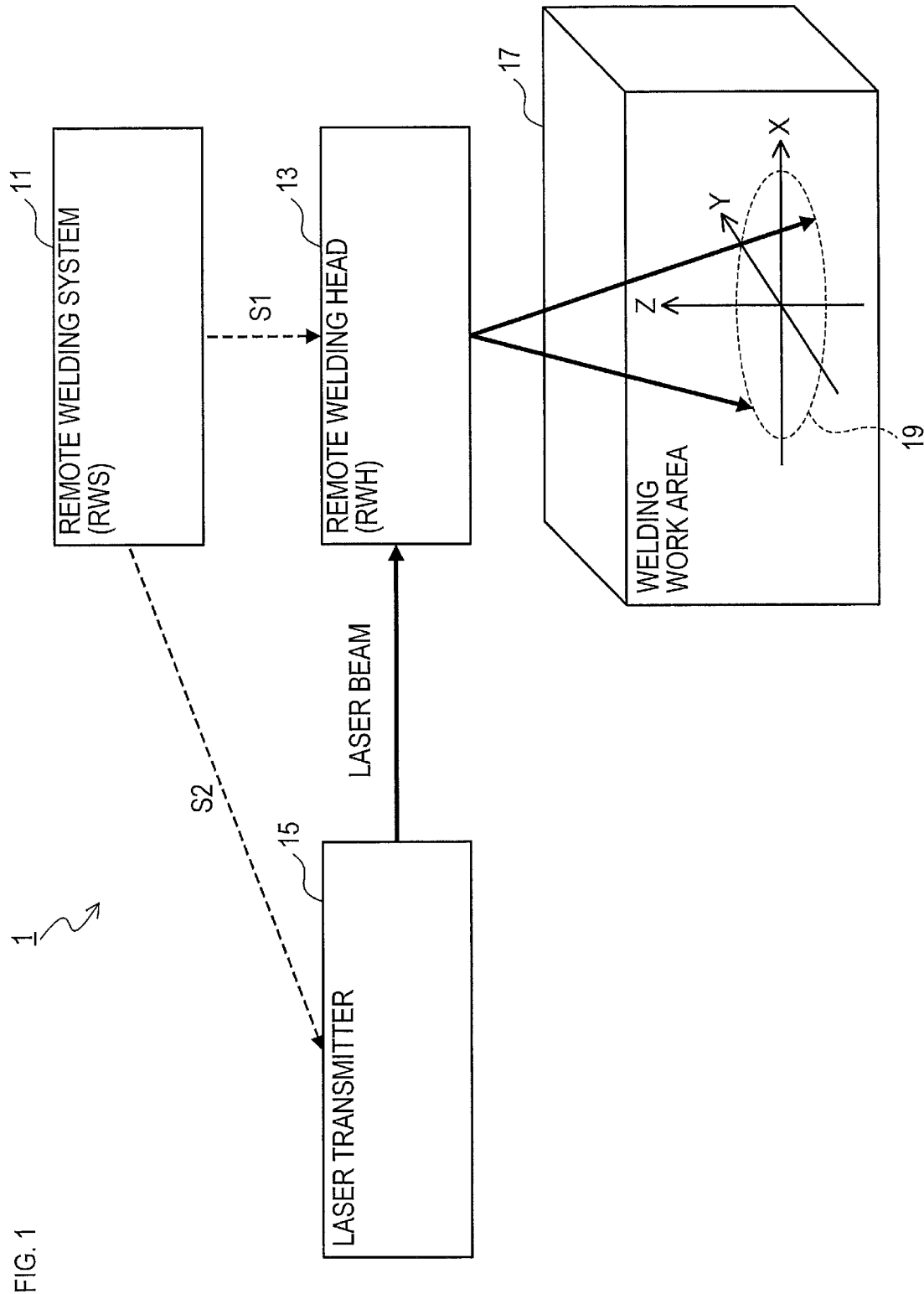
FIG. 1 is an explanatory view showing a schematic configuration of a processing apparatus.

FIG. 1 is an explanatory view showing a schematic configuration of a processing apparatus 1 of a first embodiment.

The processing apparatus 1 is a processing apparatus used to weld a workpiece placed in a processing space (a welding work area 17) using a laser.

The processing apparatus 1 comprises a remote welding system 11 (RWS 11), a remote welding head 13 (RWH 13), a laser transmitter 15, and the welding work area 17.

The remote welding system 11 transmits a first command signal S1 to the remote welding head 13, to thereby control a focal position of a laser that is emitted from the remote welding head 13 to the welding work area 17. The first command signal S1 is a signal comprising information to set the focal position of the laser. The remote welding system 11 transmits a second command signal S2 to the laser transmitter 15, to thereby control an emission state (ON/OFF) of the laser from the laser transmitter 15 to the remote welding head 13. The second command signal S2 is a signal comprising information to set the emission state of the laser.

The remote welding head 13 is configured to be able to receive the laser emitted from the laser transmitter 15 and to control an emission direction and a focal length of the laser to be emitted to the welding work area 17 based on the first command signal S1 from the remote welding system 11.

The laser transmitter 15 is configured to be able to change the emission state of the laser to the remote welding head 13 between an ON state and an OFF state based on the second command signal S2 from the remote welding system 11.

The welding work area 17 is a processing space to place therein a workpiece 19. The welding work area 17 may be configured by using a three-dimensional frame body, for example, as schematically shown in FIG. 1. The welding work area 17 is provided, for example, vertically downward of the remote welding head 13 and is configured such that the laser emitted from the remote welding head 13 can reach the workpiece 19 placed in the welding work area 17.

The processing apparatus 1 is configured to be able to specify an optional coordinate position in the welding work area 17 based on a three-dimensional orthogonal coordinate system. The present embodiment employs a three-dimensional orthogonal coordinate system in which a horizontal direction is defined as an X-axis direction and a Y-axis direction, and a vertical direction is defined as a Z-axis direction.

[1-2. Electrical Configuration of Processing Apparatus]

Figure 2:
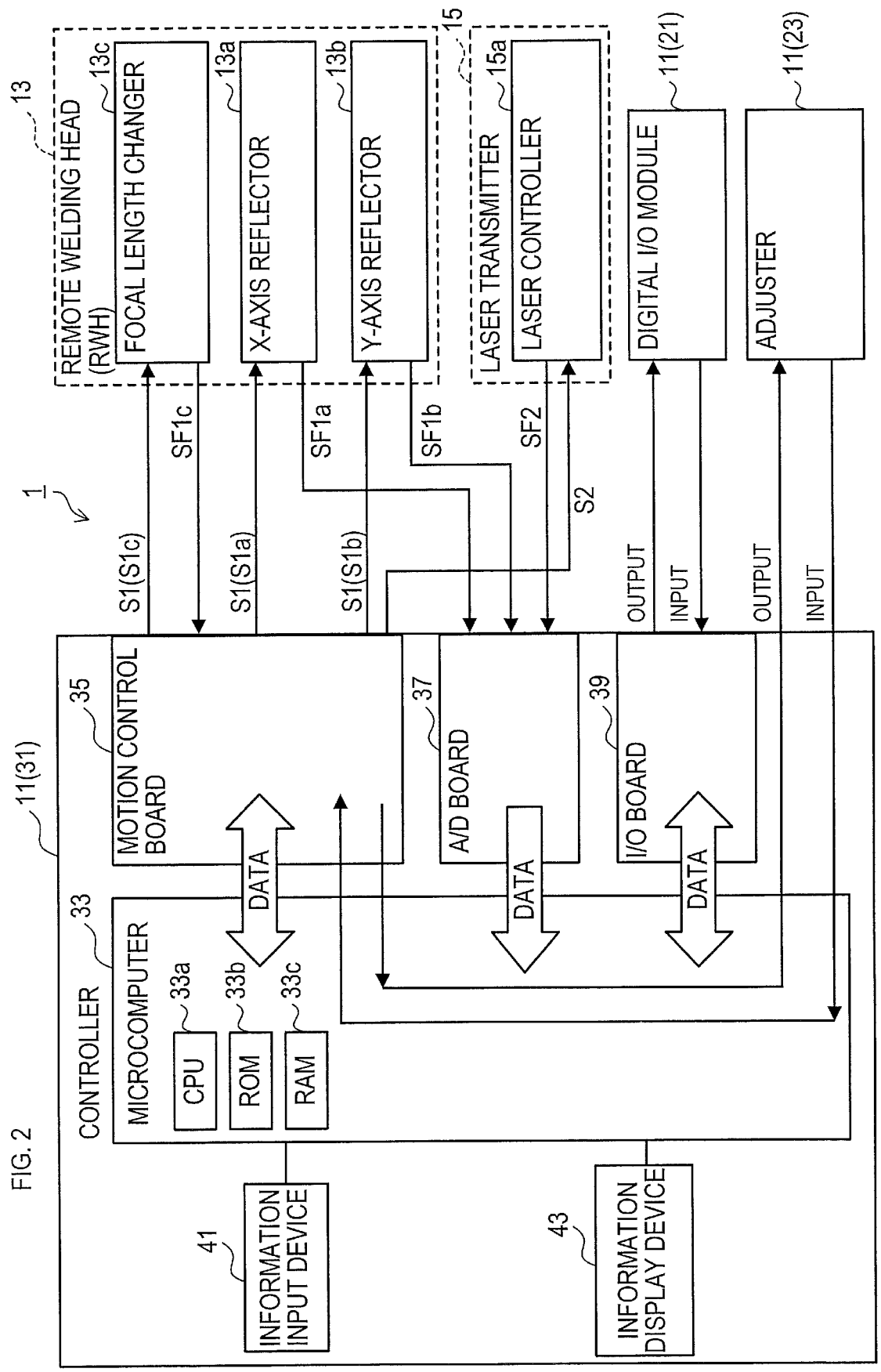
FIG. 2 is a block diagram showing an electrical configuration of the processing apparatus.

Next, a description will be given of an electrical configuration of the processing apparatus 1. FIG. 2 is a block diagram showing the electrical configuration of the processing apparatus 1.

The remote welding system 11 of the processing apparatus 1 comprises a controller 31, a digital I/O module 21, and an adjuster 23.

The controller 31 is an electronic control apparatus that transmits and receives various signals to and from various parts of the processing apparatus 1 and executes various control processes to process (weld) the workpiece 19.

The controller 31 comprises a microcomputer 33, a motion control board 35, an A/D board 37, an I/O board 39, an information input device 41, and an information display device 43.

The microcomputer 33 comprises a CPU 33a, a ROM 33b, and a RAM 33c. The microcomputer 33 is configured such that, for example, the CPU 33a executes various control processes based on programs and the like stored in the ROM 33b and the RAM 33c. The RAM 33c stores various information used in the various control processes executed by the CPU 33a.

The motion control board 35 transmits and receives various data to and from the microcomputer 33, and transmits the first command signal S1 to the remote welding head 13 and transmits the second command signal S2 to the laser transmitter 15.

The remote welding head 13 comprises an X-axis reflector 13a, a Y-axis reflector 13b, and a focal length changer 13c.

The X-axis reflector 13a and the Y-axis reflector 13b each comprise a reflection mirror (not shown) that reflects a laser emitted from the laser transmitter 15 and a galvanomotor (not shown) to change an angle (rotation state) of the reflection mirror. Specifically, the X-axis reflector 13a and the Y-axis reflector 13b are each configured to reflect the laser emitted from the laser transmitter 15 to thereby change a traveling direction of the laser. In other words, the X-axis reflector 13a and the Y-axis reflector 13b are each configured to change a reflection angle of the laser depending on the rotation state of the reflection mirror, to thereby change an X-axis component and a Y-axis component in the emission direction of the laser.

The X-axis reflector 13a is configured to comprise the X-axis component as rotatable directions of the reflection mirror. Specifically, the X-axis reflector 13a is configured to change the rotation state of the reflection mirror to thereby change the reflection angle of the laser the remote welding head 13, so that the emission direction of the laser emitted toward the welding work area 17 changes parallel to the X-axis direction. The Y-axis reflector 13b is configured to comprise the Y-axis component as rotatable directions of the reflection mirror. Specifically, the Y-axis reflector 13b is configured to change the rotation state of the reflection mirror to thereby change the reflection angle of the laser the remote welding head 13, so that the emission direction of the laser emitted toward the welding work area 17 changes parallel to the Y-axis direction.

The focal length changer 13c comprises a servo motor (not shown) to change a focal length condition including at least one of a focusing state or a collecting state of the laser emitted from the laser transmitter 15. The focal length changer 13c is configured to change the focal length condition to thereby change the focal length of the laser emitted from the remote welding head 13 toward the welding work area 17.

The first command signal S1 outputted from the motion control board 35 to the remote welding head 13 comprises an X-axis command signal S1a outputted to the X-axis reflector 13a, a Y-axis command signal S1b outputted to the Y-axis reflector 13b, and a focal length command signal S1c outputted to the focal length changer 13c. The X-axis command signal S1a is a command signal indicating a command value regarding a reflection angle of the X-axis reflector 13a. The Y-axis command signal S1b is a command signal indicating a command value regarding a reflection angle of the Y-axis reflector 13. The focal length command signal S1c is a command signal indicating a command value regarding a focal length condition of the focal length changer 13c.

The X-axis reflector 13a, the Y-axis reflector 13b, and the focal length changer 13c output feedback signals SF1a, SF1b, and SF1c, respectively, to notify the controller 31 of their respective setting states.

An X-axis feedback signal SF1a of the X-axis reflector 13a, which is a signal indicating the reflection angle of the X-axis reflector 13a, is transmitted from the X-axis reflector 13a to the A/D board 37 of the controller 31. A Y-axis feedback signal SF1b of the Y-axis reflector 13b, which is a signal indicating the reflection angle of the Y-axis reflector 13b, is transmitted from the Y-axis reflector 13b to the A/D board 37 of the controller 31. A focal length feedback signal SF1c of the focal length changer 13c, which is a signal indicating the focal length condition of the focal length changer 13c, is transmitted from the focal length changer 13c to the motion control board 35 of the controller 31.

The laser transmitter 15 comprises a laser controller 15a to control the emission state (intensity) of the laser to be emitted to the remote welding head 13. The laser controller 15a controls the emission state (intensity) of the laser to be emitted to the remote welding head 13 based on the second command signal S2.

The laser transmitter 15 outputs an emission state feedback signal SF2 to notify the controller 31 of a setting state of the laser transmitter 15. The emission state feedback signal SF2, which is a signal indicating a setting state of the laser controller 15a (the emission state of the laser), is transmitted from the laser transmitter 15 to the A/D board 37 of the controller 31.

The A/D board 37 performs A/D conversion of various analog signals, which are externally inputted, and transmits converted digital signals to the microcomputer 33.

The I/O board 39 transmits and receives various data to and from the microcomputer 33, and also transmits and receives various data to and from the digital I/O module 21.

The digital I/O module 21 comprises an input device (not shown) to input various information and a display device (not shown) to display various states in the controller 31. Examples of input methods at the input device may comprises a method of inputting various information by an operator's manual operation and a method of inputting various information by receiving information signals from other devices. The various information inputted using the input device may comprise, for example, the emission state of the laser. The various states displayed using the display device may comprise, for example, a failed state of the processing apparatus 1. Also, the digital I/O module 21 transmits and receives various information to and from peripheral devices (not shown) coupled to the remote welding system 11. Examples of the peripheral devices may comprise a printer and other control boards (control devices).

The information input device 41 is provided to allow an operator to input various information to the remote welding system 11. Examples of the various information inputted using the information input device 41 may comprise a coordinate position indicating a focal position of the laser and the emission state of the laser. The information input device 41 is configured to allow input of not only a single laser focal position but also a plurality of laser focal positions. That is, by using the information input device 41, not only information regarding a welding operation (processing operation) at one point but also information regarding a series of welding operations (processing operations) at a plurality of points may be inputted.

The information display device 43 is provided to display various states in the controller 31. The various states displayed using the information display device 43 may comprise, for example, a setting state of the focal position of the laser and a failed state of the processing apparatus 1. Also, the information display device 43 may display not only a setting state regarding a welding operation (processing operation) at one point but also a setting state regarding a series of welding operations (processing operations) at a plurality of points.

The adjuster 23 is a device that is usable to adjust the focal position of the laser by receiving a command from an operator and changing the focal position of the laser based on the command. The adjuster 23 comprises a touch panel (not shown) or an operation dial (not shown), and is configured to receive an operator's command through the operator's input operation on the touch panel or a rotating operation of the operation dial. The adjuster 23 is configured to be able to transmit and receive various information to and from the motion control board 35 via the microcomputer 33, and transmits a command signal in accordance with the operator's command to the motion control board 35. The adjuster 23 comprises a display section (not shown) and is configured to display various information (for example, a coordinate position indicating the focal position of the laser) received from the motion control board 35 on the display section. Further, the adjuster 23 may be configured, for example, by using a teach pendant.

By visualizing the laser focal position in the welding work area 17 using a laser visualization device and shifting the laser focal position to a specified position using the adjuster 23, it is possible to find details of the first command signal S1 (or the feedback signals SF1a, SF1b, and SF1c) in a case of setting the laser focal position to the specified position. In other words, it is possible to find a correspondence between a coordinate position (an X value, a Y value, and a Z value in the three-dimensional orthogonal coordinate system) of the specified position and the details of the first command signal S1 (setting states of the X-axis reflector 13a, the Y-axis reflector 13b, and the focal length changer 13c) in the case of setting the laser focal position to the coordinate position.

By optionally changing the specified position and repeatedly performing the aforementioned operations with respect to a plurality of coordinate positions, and recording the correspondence, it is possible to prepare coordinate conversion information in which correspondence between an optional coordinate position in the welding work area 17 and the details of the first command signal S1 in the case of setting the laser focal position to the optional coordinate position. The coordinate conversion information prepared as described above is previously stored in the ROM 33b of the microcomputer 33.

[1-3. Welding Condition Setting Process]

Next, a description will be given of a welding condition setting process executed in the microcomputer 33.

The welding condition setting process is a process configured to receive a setting operation of a laser focal position (the welding condition) by an operator, to execute a welding operation in the set laser focal position, to receive a correcting operation of the laser focal position and execute a welding operation again if a sufficient welding quality is not obtained, whereas to terminate setting of the laser focal position (the welding condition) if a sufficient welding quality is obtained.

A program that records details of the welding condition setting process is stored in the ROM 33b or the RAM 33c. During execution of the welding condition setting process, the program is read from the ROM 33b or the RAM 33c and is executed by the CPU 33a.

Figure 3:
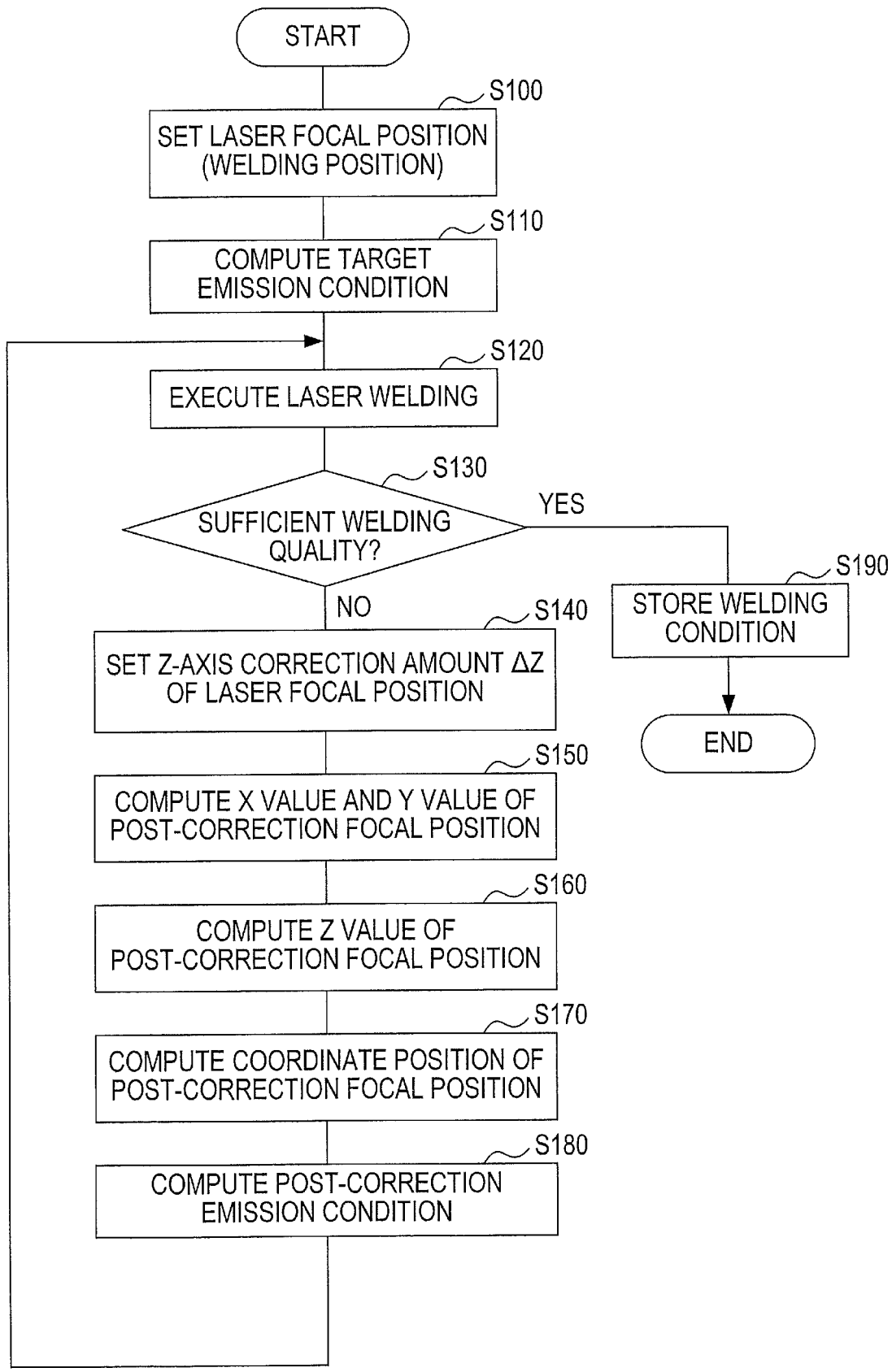
FIG. 3 is a flowchart showing details of a welding condition setting process.

FIG. 3 is a flowchart showing details of the welding condition setting process.

When the welding condition setting process is started, a process of setting the laser focal position (the welding condition) is first executed in S100 (S represents "Step"). Specifically, an operator's input operation using the information input device 41 or the adjuster 23 is received, and a coordinate position specified by the input operation is set as a coordinate position (an X value, a Y value, and a Z value in the three-dimensional orthogonal coordinate system) of the laser focal position.

In subsequent S110, a process is executed of computing a target emission condition corresponding to the coordinate position of the laser focal position, which is set in S100, based on the above-described coordinate conversion information that is previously stored in the ROM 33b. The target emission condition means details of the first command signal S1 (the setting states of the X-axis reflector 13a, the Y-axis reflector 13b, and the focal length changer 13c).

In subsequent S120, the target emission condition (the details of the first command signal S1) obtained by the computation in S110 is set in the remote welding head 13 (the X-axis reflector 13a, the Y-axis reflector 13b, and the focal length changer 13c), and then the emission state of the laser by the laser transmitter 15 is set to the ON-state, to thereby execute a welding operation on the workpiece 19.

In subsequent S130, the process waits until a determination result is inputted by the operator on whether a welded portion formed in the workpiece 19 satisfies a specified welding quality. The process proceeds to S190 if the inputted determination result is "sufficient" (positive determination), whereas the process proceeds to S140 if the determination result is "not sufficient" (negative determination).

The determination result is inputted by the operator's input operation using the information input device 41 or the adjuster 23. Also, the determination on whether the welded portion has a sufficient welding quality is made, for example, based on specified determination items (such as whether a welding position is proper, whether a welding strength is sufficient).

Figure 4:
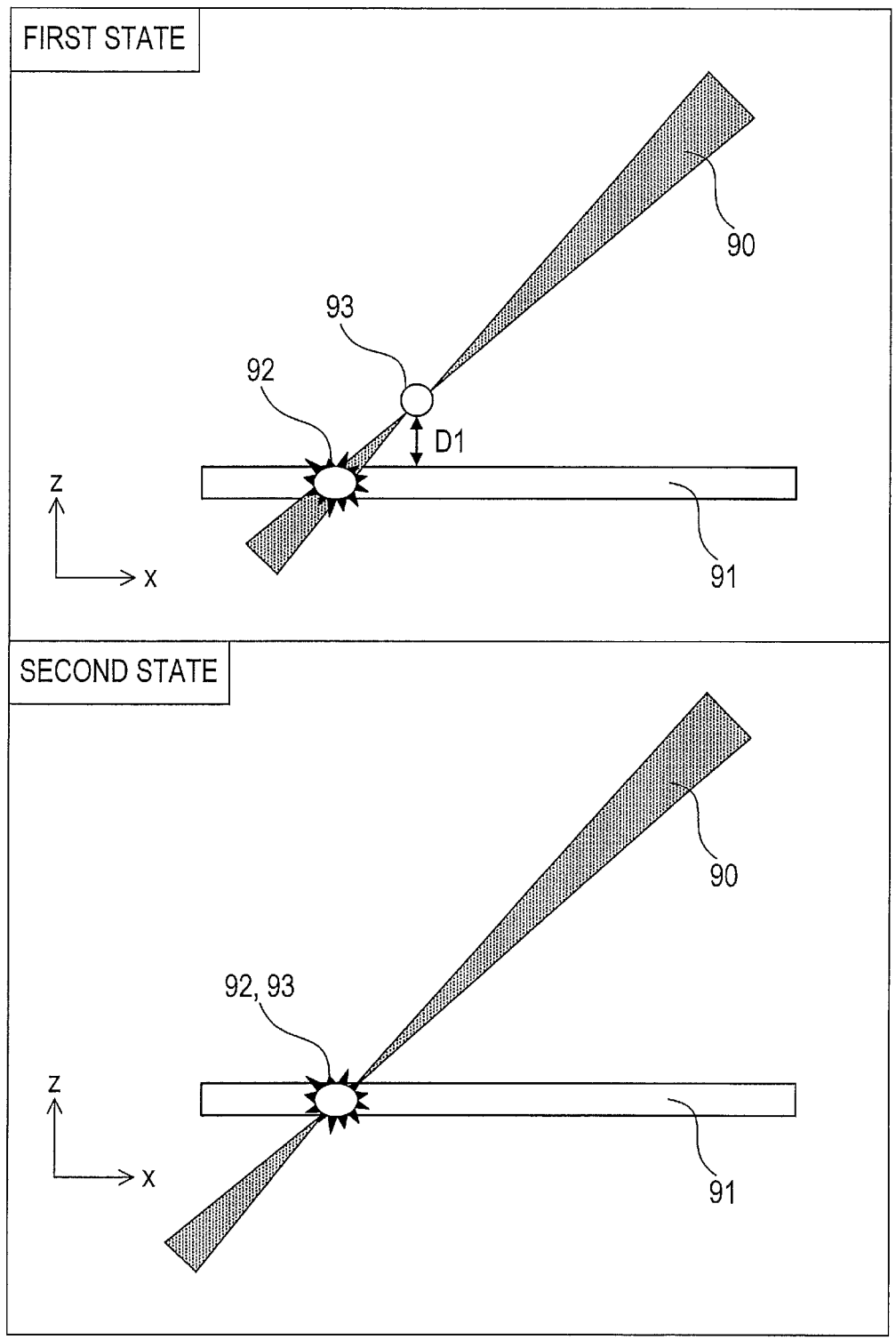
FIG. 4 is an explanatory view showing a state in which a laser focal position is set (corrected) to a target processing position by performing the welding condition setting process.

A state in which a laser focal position 93 is deviated from a target welding position 92, that is a state in which the welded portion does not have a sufficient welding quality is shown as a first state in FIG. 4. In FIG. 4, an optional coordinate position in the welding work area 17 is represented in a three-dimensional orthogonal coordinate system (a coordinate system defined by an X-axis direction, a Y-axis direction, and a Z-axis direction), and the right-left direction of the figure is the X-axis direction and the up-down direction of the figure is the Z-axis direction, thereby showing the states of the various parts.

In the first state in FIG. 4, although an emission direction of a laser 90 is properly set toward the target welding position 92 of a workpiece 91, a laser focal length is incorrect; thus, the laser focal position 93 is deviated from the target welding position 92, and proper processing (welding) in the target welding position 92 of the workpiece 91 cannot be performed. In this case, since the emission direction of the laser 90 intersects the target welding position 92 of the workpiece 91, welding traces by the laser 90 are formed. However, a welding energy is insufficient not in the laser focal position 93, leading to an insufficient welding quality of the welded portion. The workpiece 91 with such insufficient welding quality is determined by the operator that "the welded portion does not have a sufficient welding quality." In this case, the determination result inputted by the operator in S130 is "not sufficient" (negative determination), and the process proceeds to S140.

To determine the welding quality of the welded portion, the operator measures an error dimension between the laser focal position 93 and the target welding position 92. Since the laser used for processing (welding) by the processing apparatus 1 is an invisible light, the operator measures the laser focal position 93 using a measuring device for measuring laser focal positions, and then measures the error dimension between the laser focal position 93 and the target welding position 92. In a case of using the measuring device, it is difficult to measure a relative positional relationship (errors in the X-axis direction, the Y-axis direction, and the Z-axis direction) between the laser focal position 93 and the target welding position 92; thus, the operator measures a distance D1 (the error in the Z-axis direction) between the laser focal position 93 and the workpiece 91.

After proceeding to S140 because of the negative determination in S130, the process waits until the operator inputs a correction amount of the laser focal position (the welding condition) in S140, and an inputted value is set as a correction amount $\Delta Z$ in the Z-axis direction of the laser focal position (the welding condition). The operator inputs the distance D1 (the error in the Z-axis direction) between the laser focal position 93 and the workpiece 91, which is measured by the operator, as the correction amount $\Delta Z$ in the Z-axis direction using the information input device 41 or the adjuster 23

In subsequent S150, an X value and a Y value in a post-correction focal position is computed based on the correction amount $\Delta Z$ in the Z-axis direction, which is set in S140. For the computation, Formula 1 and Formula 2 are used.

$$X1 = X0 + \Delta Z \times \tan(2 \times \theta x) \qquad \text{[Formula 1]}$$

$$Y1 = Y0 + \Delta Z \times \tan(2 \times \theta y) \qquad \text{[Formula 2]}$$

Formula 1 and Formula 2 are each an arithmetic expression in which a pre-correction focal position is P0 (X0, Y0, Z0), a post-correction focal position is P1 (X1, Y1, Z1), a rotation angle of the X-axis reflector 13a is $\theta x$, and a rotation angle of the Y-axis reflector 13b is $\theta y$.

A description will now be given of a basis that the X value and the Y value in the post-correction focal position can be computed by Formula 1 and Formula 2 with reference to FIG. 5 and FIG. 6.

Figure 5:
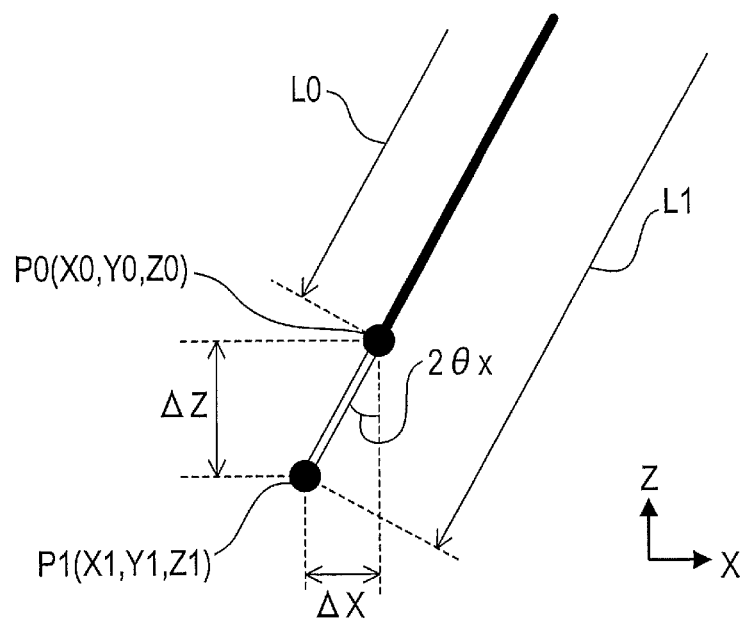
FIG. 5 is an explanatory view showing a positional relationship between a pre-correction focal position P0 and a post-correction focal position P1 in an X-Z plane (a plane including an X-axis and a Z-axis).

FIG. 5 is an explanatory view showing a positional relationship between the pre-correction focal position P0 and the post-correction focal position P1 in an X-Z plane (a plane including an X-axis and a Z-axis). FIG. 6 is an explanatory view showing a relationship between the rotation angle $\theta x$ of the X-axis reflector 13a and the emission direction of the laser.

In FIG. 5, the pre-correction focal position P0 corresponds to the laser focal position 93 in the first state in FIG. 4, and the post-correction focal position P1 corresponds to the target welding position 92 in the first state in FIG. 4. In FIG. 5, L0 represents a focal length condition (focal length) set to the focal length changer 13c when the laser focal position is set to the pre-correction focal position P0, and L1 represents a focal length condition (focal length) set to the focal length changer 13c when the laser focal position is set to the post-correction focal position P1.

As shown in FIG. 5, with respect to a relative positional relationship between the pre-correction focal position P0 and the post-correction focal position P1, a correction amount $\Delta X$ (=X1−X0) in the X-axis direction and a correction amount $\Delta Z$ (=Z1−Z0) in the Z-axis direction have a positional relationship defining an angle $2\theta x$ therebetween.

Figure 6:
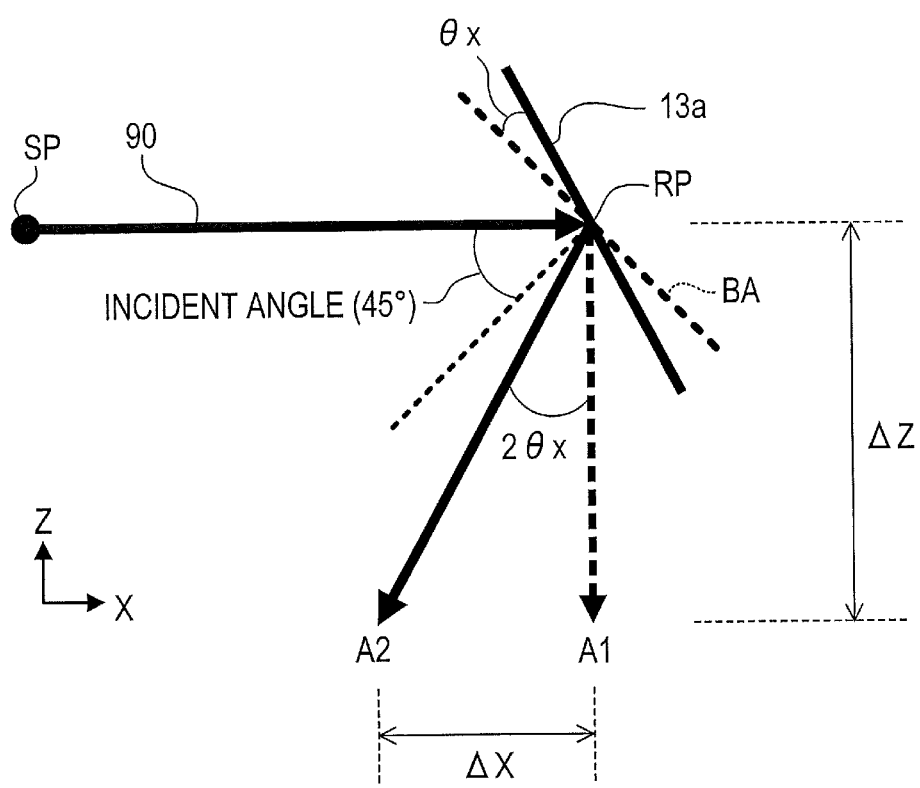
FIG. 6 is an explanatory view showing a relationship between a rotation angle θx of an X-axis reflector and an emission direction of a laser.

As shown in FIG. 6, after the laser 90 emitted from a transmission source SP is reflected at a reflection position RP of the X-axis reflector 13a (specifically the reflection mirror), the traveling direction is an A1-direction if the X-axis reflector 13a is in the reference position BA and is an A2-direction if the X-axis reflector 13a is rotated from the reference position BA by a rotation angle θx. In this case, an angle between the A1-direction and the A2-direction is 2×θx. An angular position (a rotation state) of the X-axis reflector 13a is set as "the reference position BA" when an incident angle of the laser 90 to the X-axis reflector 13a (specifically, the reflection mirror) is 45 degrees.

It should be understood from the above that the correction amount ΔX in the X-axis direction is equal to "ΔZ×tan(2×θx)" and that the X value (X1) at the post-correction focal position P1 can be computed by Formula 1. The Y value (Y1) at the post-correction focal position P1 also can be computed by Formula 2 for the same reason. That is, "ΔZ×tan(2×θx)" in Formula 1 corresponds to the X-axis correction amount ΔX, and "ΔZ×tan(2×θy)" in Formula 2 corresponds to the Y-axis correction amount ΔY.

The rotation angle θx of the X-axis reflector 13a can be used as information concerning changes in the X-axis component of the emission direction of the laser (X-axis component information in the rotation state of the reflector) of information concerning the rotation state of the X-axis reflector 13a. That is, if a virtual vector indicating the rotation state of the X-axis reflector 13a (for example, a direction of a reflection surface of the reflection mirror) is imagined, the rotation angle θx of the X-axis reflector 13a is an angle between a projection vector obtained by projecting the virtual vector on the X-Z plane (for example, a solid line indicating the X-axis reflector 13a in FIG. 6) and a specified reference vector (for example, the reference position BA in FIG. 6).

Similarly, a rotation angle θy of the Y-axis reflector 13b can be used as information concerning changes in the Y-axis component of the emission direction of the laser (Y-axis component information in the rotation state of reflector) of information concerning the rotation state of the Y-axis reflector 13b. That is, if a virtual vector indicating the rotation state of the Y-axis reflector 13b (for example, a direction of a reflection surface of the reflection mirror) is imagined, the rotation angle θy of the Y-axis reflector 13b is an angle between a projection vector obtained by projecting the virtual vector on the Y-Z plane and a specified reference vector.

Returning to FIG. 3, in subsequent S160, a Z value at the post-correction focal position is computed based on the correction amount ΔZ in the Z-axis direction. For this computation, Formula 3 is used.

$$Z1 = Z0 + \Delta Z \qquad \text{[Formula 3]}$$

In subsequent S170, a coordinate position of the post-correction focal position P1 is determined based on computation results (X1, Y1, Z1) in S150 and S160.

In subsequent S180, a process is executed of computing the target emission condition (hereinafter also referred to as the post-correction emission condition) corresponding to the coordinate position (X1, Y1, Z1) of the post-correction focal position P1 based on the above-described coordinate conversion information that is previously stored in the ROM 33b. The post-correction emission condition corresponds to details (respective set conditions of the X-axis reflector 13a, the Y-axis reflector 13b, and the focal length changer 13c) of the first command signal S1 so as to set the focal position of the laser to the post-correction focal position P1.

When S180 is completed, the process returns to S120. In S120 after executing S180, in place of the target emission condition obtained by the computation in S110, the post-correction emission condition (the details of the first command signal S1) obtained by the computation in S180 is set to the remote welding head 13 (the X-axis reflector 13a, the Y-axis reflector 13b, and the focal length changer 13c). That is, in S120 this time, the post-correction emission condition obtained by the computation in S180 are set to the remote welding head 13, and then the emission state of the laser by the laser transmitter 15 is set to an ON-state, so that a welding operation on the workpiece 19 is executed.

Here, a state in which the laser focal position 93 coincides with the target welding position 92, in other words, a state in which the welded portion has a sufficient welding quality is represented as a second state in FIG. 4.

The second state in FIG. 4 is a state in which the emission direction of the laser 90 is set properly toward the target welding position 92 of the workpiece 91, and the laser focal length is set properly, so that the laser focal position 93 coincides with the target welding position 92, and proper processing (welding) can be performed at the target welding position 92 of the workpiece 91. That is, welding with sufficient strength and without positional deviation of the welded portion can be achieved; thus, a good welding quality of the welded portion can be obtained, and the operator determines that "the welded portion has a sufficient welding quality."

Thereafter, the process proceeds to S130, and then the process proceeds to S190 if the determination result inputted by the operator is "sufficient" (positive determination).

In S190, a process is executed of storing (recording) the target emission condition (or the post-correction emission condition) corresponding to a coordinate position of the laser focal position that is finally set.

By executing the welding condition setting process as described above, if the welded portion does not have a sufficient welding quality, correction of the laser focal position (the welding condition) is made to thereby set (correct) the welding condition so that the welded portion after the correction will achieve a sufficient welding quality. In particular, for the correction, the operator is required to input only a correction amount in the Z-axis direction and is not required to input a correction amount in the X-axis direction or the Y-axis direction; thus, a workload for the correction is reduced as compared with a configuration that requires input of a correction amount in each of the X-axis direction, Y-axis direction, and the Z-axis direction.

Figure 7:
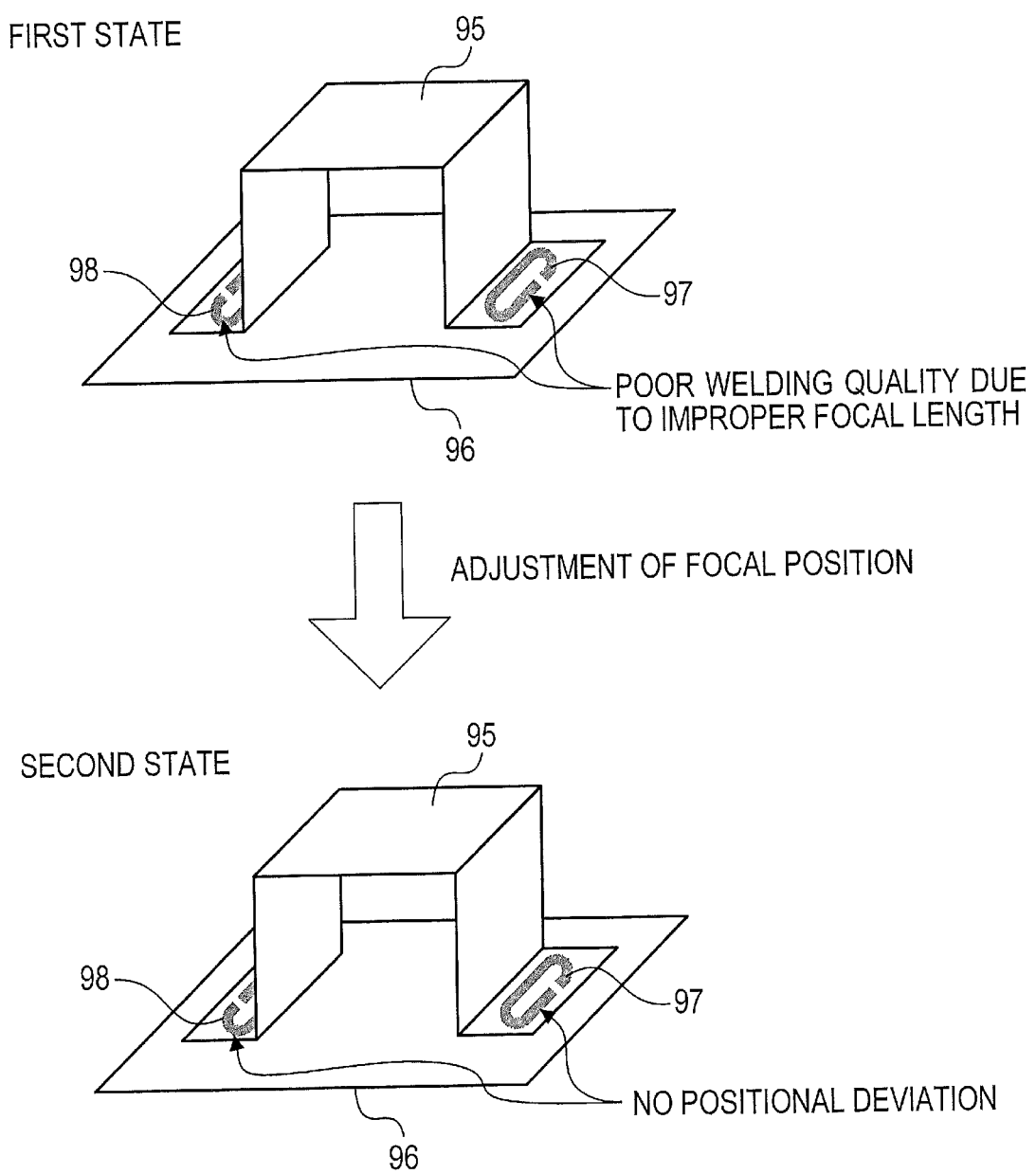
FIG. 7 is an explanatory view showing a state in which a welding condition can be set (corrected) such that a welded portion has a sufficient welding quality by performing a welding condition setting process.
Figure 8:
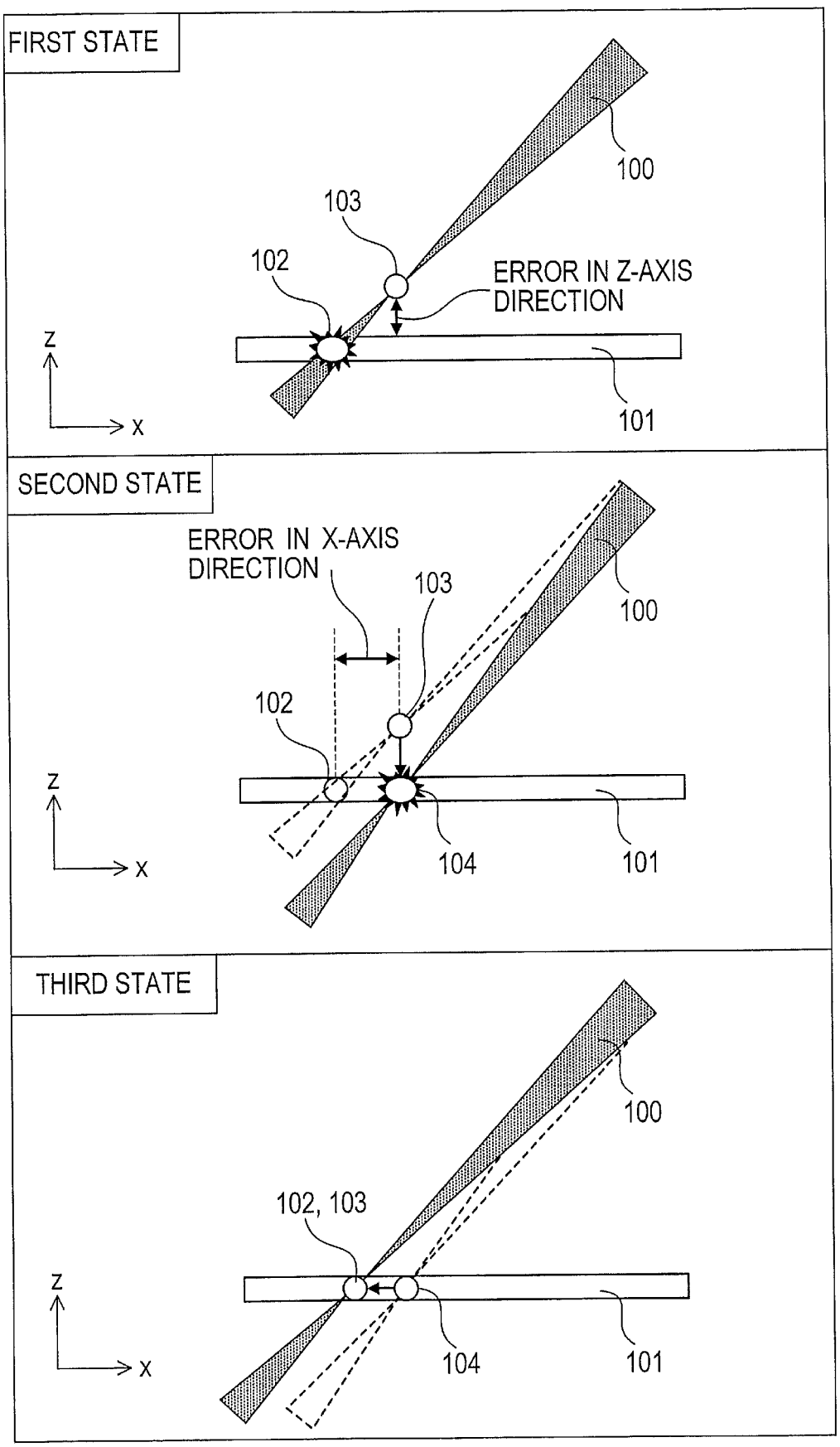
FIG. 8 is an explanatory view of a position adjustment operation performed in a conventional processing apparatus.
Figure 9:
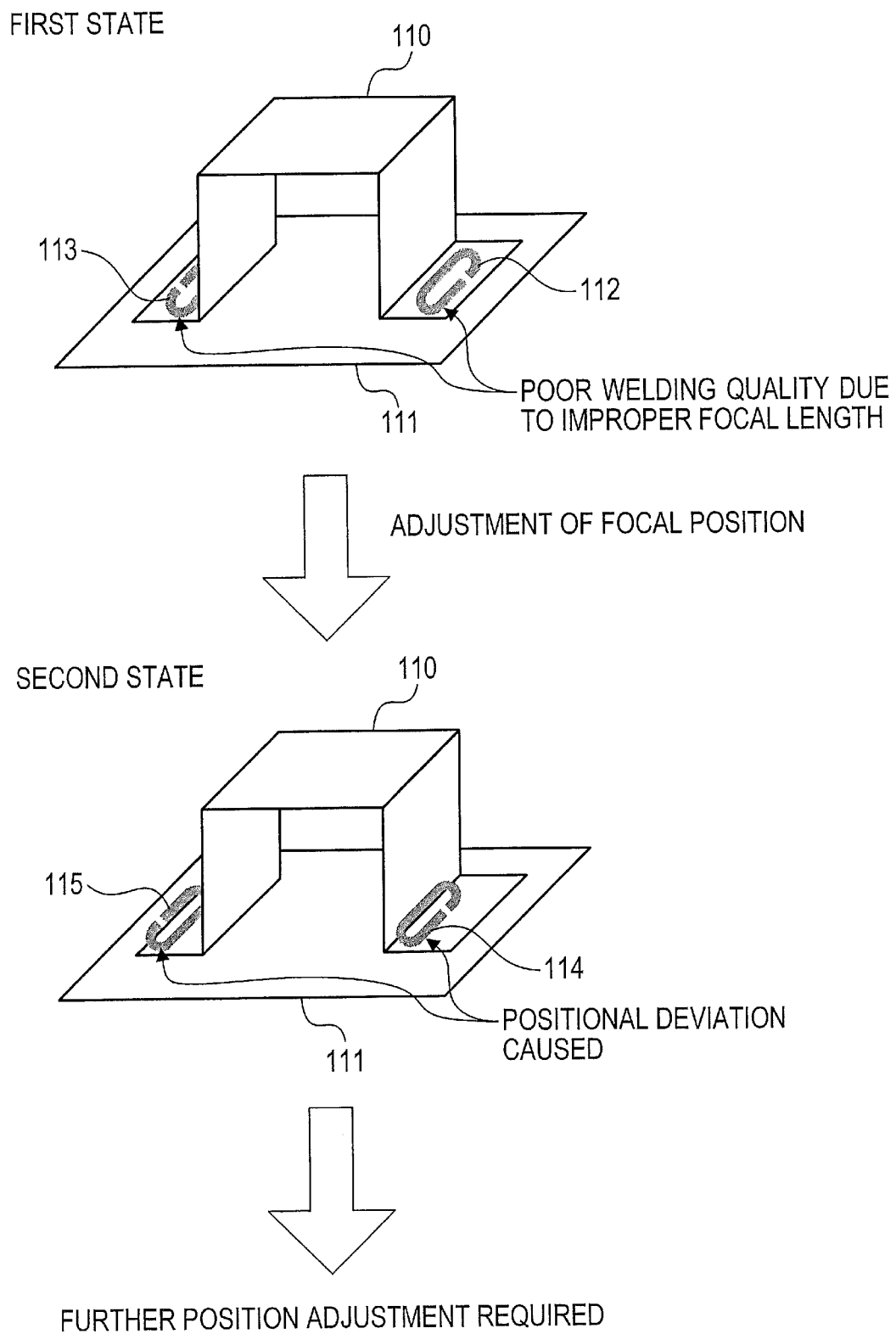
FIG. 9 is an explanatory view showing a state in which an error in processing position is caused by performing a position adjustment operation in the conventional processing apparatus.

For example, as shown in a first state in FIG. 7, if the laser focal length is improper although the emission direction of the laser is properly set toward the target welding positions 97 and 98 when welding the first member 95 and the second member 96, welding traces are formed at the target welding positions 97 and 98, providing an insufficient strength and thus a poor welding quality. It is, therefore, required to perform adjustment operation of the laser focal position along a stacking direction of the first member 95 and the second member 96 such that the laser focal position coincides with each of the target welding positions 97 and 98 in order to achieve welding (processing) with a proper quality at the target welding positions 97 and 98.

Accordingly, the operator inputs a correction amount of the laser focal position (the welding condition) to thereby correct the laser focal position (the welding condition) in S140 of the welding condition setting process, so that welding (processing) with a proper quality at the target welding positions 97 and 98 can be achieved without positional deviation of the welded portions as shown in a second state in FIG. 7.

[1-4. Effects]

As described above, the processing apparatus 1 of the present embodiment comprises the remote welding head 13 comprising the X-axis reflector 13a, the Y-axis reflector 13b, and the focal length changer 13c. The remote welding head 13 is configured to change the reflection angle of the X-axis reflector 13a and the reflection angle of the Y-axis reflector 13b to thereby control the emission direction of the laser, and to change the focal length condition of the focal length changer 13c to thereby control the focal length of the laser. That is, the remote welding head 13 changes each of the reflection angle of the X-axis reflector 13a, the reflection angle of the Y-axis reflector 13b, and the focal length condition of the focal length changer 13c to thereby change the laser focal position in the welding work area 17.

In the processing apparatus 1, when the microcomputer 33 to execute S140 of the welding condition setting process sets the correction amount inputted by the operator as the correction amount ΔZ in the Z-axis direction of the laser focal position (the welding condition), the microcomputer 33 to execute S150 to S170 computes the X-axis correction amount ΔX and the Y-axis correction amount ΔY using the Z-axis correction amount ΔZ and also computes the coordinate position (X1, Y1, Z1) of the post-correction focal position P1. In other words, in a case of specifying the coordinate position (X1, Y1, Z1) of the post-correction focal position P1 using the processing apparatus 1, the operator is required to specify only the Z-axis correction amount ΔZ and is not required to specify the X-axis correction amount ΔX and the Y-axis correction amount ΔY.

Also, the microcomputer 33 to execute S180 computes the target emission condition (also referred to as the post-correction emission condition) corresponding to the coordinate position (X1, Y1, Z1) of the post-correction focal position P1, the microcomputer 33 to execute S120 controls the remote welding head 13 and the laser transmitter 15 so as to emit the laser under the post-correction emission condition. This enables setting (correction) of the laser focal position 93 to the target welding position 92 in accordance with the Z-axis correction amount ΔZ specified by the microcomputer 33 executing S140.

That is, the processing apparatus 1 can set (correct) the laser focal position 93 to the target welding position 92 by performing the position adjustment operation based only on the Z-axis correction amount ΔZ even if an error occurs between the laser focal position 93 and the target welding position 92.

Accordingly, the processing apparatus 1 enables reduction in time necessary for the position adjustment operation of the laser focal position and reduction in workload.

The processing apparatus 1 corresponds to one example of a processing apparatus, the welding work area 17 corresponds to one example of a processing space, the remote welding head 13 and the laser transmitter 15 correspond to one example of a laser emitter, the microcomputer 33 to execute S100 corresponds to one example of a processing position specifying device, the microcomputer 33 to execute S110 corresponds to one example of a target emission condition computing device, and the microcomputer 33 to execute S120 corresponds to one example of an emission controller.

The X-axis reflector 13a and the Y-axis reflector 13b correspond to one example of an emission direction changer, and the focal length changer 13c corresponds to one example of a focal length changer.

The microcomputer 33 to execute S140 corresponds to one example of a correction amount specifying device, the microcomputer 33 to execute S150 to S170 corresponds to one example of a post-correction focal position computing device, and the microcomputer 33 to execute S180 corresponds to one example of a post-correction emission condition computing device.

2. Other Embodiments

Although one embodiment of the present disclosure has been described above, the present disclosure is not limited to the above-described embodiment, but may be practiced in various forms within a scope not departing from the subject matter of the present disclosure.

For example, although the above embodiment describes a processing apparatus in which a form of processing by the laser is "welding," the form of processing is not limited to welding. For example, the present disclosure may be applied to a processing apparatus configured to perform cutting by the laser.

Also, although the above embodiment describes a configuration in which a ROM or a RAM storing programs is previously incorporated in the microcomputer 33, the present disclosure is not limited to such configuration. For example, a configuration may be employed in which programs are recorded in a non-transitory tangible computer-readable recording medium and loaded on a computer system when necessary, or in which programs are downloaded to a computer system via a communication network. Examples of the non-transitory tangible computer-readable recording medium may include an optical disk, such as a CD-ROM and a DVD, a magnetic disk, and a portable semiconductor memory (for example, a USB memory, a Memory Card (Registered Trademark), etc.).

Further, although the controller 31 of the processing apparatus is configured to comprise the microcomputer 33 in the above-described embodiment, the present disclosure is not limited to such configuration. For example, the controller may be configured with hardware, such as an electric circuit, in place of the configuration of a microcomputer using software.

Also, although the above embodiment describes a configuration in which the remote welding head 13 comprises two reflectors (the X-axis reflector and the Y-axis reflector), the present disclosure is not limited to such configuration. For example, the remote welding head may comprise a single reflector, and the reflector may be configured such that rotatable directions for changing the direction of the reflection surface of the reflector includes the X-axis component and the Y-axis component.

Moreover, the changer (an element to change the emission direction of the laser) provided to the remote welding head 13 is not limited to the above-described reflector (a reflection-type changer). For the changer provided to the remote welding head 13, a transmission-type changer, for example, may be employed that changes the emission direction of the laser depending on a transmission angle when the laser transmits therethrough.

Further, although the above embodiment describes a configuration in which the processing space (the welding work area 17) is provided vertically downward from the laser emitter (the remote welding head 13), the present disclosure is not limited to such configuration. For example, it may be possible to employ a configuration in which the processing space is provided vertically upward of the laser emitter, or a configuration in which the processing space is provided horizontally adjacent to the laser emitter. In the configuration in which the processing space is provided vertically upward of the laser emitter, "a three-dimensional orthogonal coordinate system in which horizontal directions are defined as the X-axis direction and the Y-axis direction, and the vertical direction is defined as the Z-axis direction" is to be employed, as in the above-described embodiment. In the configuration in which the processing space is provided horizontally adjacent to the laser emitter, "a three-dimensional orthogonal coordinate system in which one of the horizontal directions from the laser emitter toward the processing space is defined as the Z-axis direction, and directions perpendicular to the Z-axis direction are defined as the X-axis direction and the Y-axis direction" is to be employed.

The invention claimed is:

1. A processing apparatus, which is provided with a processing space to place a workpiece therein and configured to process the workpiece placed in the processing space using a laser, the processing apparatus comprising:
    a laser emitter configured to change, when emitting the laser toward the processing space, an emission condition that comprises at least an emission direction and a focal length of the laser, to thereby change a focal position of the laser in the processing space;
    a processing position specifying computerized device configured to specify a target processing position on the workpiece based on a coordinate position in a three-dimensional orthogonal coordinate system in the processing space, the three-dimensional orthogonal coordinate system including an X-axis, a Y-axis and a Z-axis, the Z-axis extending from the laser emitter to the processing space, and the X-axis and the Y-axis being orthogonal to the Z-axis;
    a target emission condition computing configured to compute a target emission condition based on coordinate conversion information, the coordinate conversion information associating the coordinate position with a first emission condition, the first emission condition corresponding to the emission condition in a case of setting the focal position to the coordinate position, and the target emission condition corresponding to the emission condition corresponding to the coordinate position of the target processing position; and
    an emission controlling computerized device configured to control the laser emitter so as to emit the laser under the target emission condition, and
    wherein the laser emitter comprises:
        an emission direction changing device comprising at least one optical changer to change the emission direction of the laser and configured to change the emission direction of the laser depending on a rotational position of the at least one optical changer to thereby change an X-axis component and a Y-axis component in the emission direction of the laser;
        a focal length changer configured to change a focal length condition comprising at least one of a focusing state or a collecting state of a laser emission, to thereby change the focal length of the laser, and
    wherein the processing apparatus further comprises:
        a correction amount specifying computerized device configured to specify a Z-axis correction amount, which is a difference value in the Z-axis direction between a pre-correction focal position where the pre-correction focal position is a focal position deviated from the target processing position on the workpiece, and a post-correction focal position, where the post-correction focal position is a focal position intersecting the target processing position on the workpiece;
        a post-correction focal position computing device configured to compute an X-axis correction amount, which is a difference value in the X-axis direction between the pre-correction focal position and the post-correction focal position based on the Z-axis correction amount and the roatational position of the at least one optical changer of the emission direction to compute a Y-axis correction amount, which is a difference value in the Y-axis direction between the pre-correction focal position and the post-correction focal position based on the Z-axis correction amount and the rotational position of the at leat one optical changer in the Y-axis direction corresponding to the Y-axis component change in the emission direction and to compute a coordinate position of the post-correction focal position using the X-axis correction amount, the Y-axis correction amount, the Z-axis correction amount, and a coordinate position of the pre-correction focal position; and
        a post-correction emission condition computing device configured to compute a post-correction emission condition, which is the emission condition corresponding to the coordinate position of the post-correction focal position, based on the coordinate conversion information, and
    wherein the emission controlling computerized device is configured to control the laser emitter to emit the laser under the post-correction emission condition when the Z-axis correction amount is specified in the correction amount specifying computerized device.

2. A processing apparatus comprising,
    a laser emitter configured to emit a laser, the laser emitter comprising an emission direction optical changer configured to rotate to thereby change an emission direction of the laser in accordance with a rotational position of the emission direction optical changer;
    a processing position specifying computerized device configured to specify a target processing position on a workpiece based on a coordinate position in a three-dimensional orthogonal coordinate system in a processing space, the three-dimensional orthogonal coordinate system including an X-axis, a Y-axis, and a Z-axis, the Z-axis extending from the laser emitter to the processing space, and the X-axis and the Y-axis being orthogonal to the Z axis;
    a target emission condition computing device configured to compute the emission direction of the laser toward a target coordinate in the processing space based on coordinate conversion information, and the coordinate conversion information being previously set and associating the target coordinate with the emission direction;
    an emission direction changing computerized device configured to rotationally drive the emission direction optical changer to change an X-axis component and a Y-axis component of the laser, the X-axis component corresponding to a component of the laser along the X-axis, and the Y-axis component corresponding to a component of the laser along the Y-axis;
    a correction amount specifying computerized device configured to specify a Z-axis correction amount, the Z-axis correction amount corresponding to a difference in the Z-axis direction between a pre-correction focal position, where the pre-correction focal position is a foal position deviated from the target coordinate that corresponds to the target processing position on the workpiece, and a post-correction focal position, where the post-correction position is a focal position intersecting the target coordinate that corresponds to the target processing position on the workpiece, the pre-correction focal position corresponding to a focal position of the laser before correction, and the post-correction focal position corresponding to a focal position of the laser after correction;

a post-correction focal position computing device configured to compute a coordinate position corresponding to the post-correction focal position, the post-correction focal position computing device being configured to compute an X-axis correction amount and a Y-axis correction amount based on the Z-axis correction amount and a rotation position of the emission direction optical changer in an X-axis direction and Y-axis direction, the X-axis correction amount corresponding to a difference in the X-axis direction between the pre-correction focal position and the post-correction focal position, and the Y-axis correction amount corresponding to a difference in the Y-axis direction between the pre-correction focal position and the post-correction focal position;

a post-correction emission condition computing device configured to compute the target coordinate corresponding to the post-correction focal position based on the coordinate conversion information; and an emission controlling computerized device configured to control the laser emitter so as to emit the laser in accordance with the X-axis correction amount, the Y-axis correction amount, and the Z-axis correction amount.

3. The processing apparatus according to claim 2,
wherein the target emission condition computing device is further configured to compute a focal length of the laser to the target coordinate, additionally to compute the emission direction,
wherein the coordinate conversion information associates the target coordinate with the emission direction and the focal length, and
wherein the processing apparatus further comprises a focal length changer configured to change a focusing state and/or a collecting state of a laser emission such that the focal length is changed.

4. The processing apparatus according to claim 1, comprising an information input computing device configured to allow an operator of the processing apparatus to input a first correction amount.

5. The processing apparatus according to claim 4,
wherein the information input computing device is configured to allow input of a one of a first information and a second information, the first information being regarding a processing operation at one point, and the second information being regarding a series of processing operations at two or more points.

6. The processing apparatus according to claim 2, comprising an information input computing device configured to allow an operator of the processing apparatus to input a first correction amount.

7. The processing apparatus according to claim 6,
wherein the information input computing device is configured to allow input of at least one of a first information and a second information, the first information being regarding a processing operation at one point, and the second information being regarding a series of processing operations at two or more points.

* * * * *